United States Patent [19]
Donahue et al.

[11] 3,807,818
[45] Apr. 30, 1974

[54] BEARING ASSEMBLY

[75] Inventors: Jerome T. Donahue, Milwaukee, Wis.; Walter F. Hess, Deerfield, Ill.; Gordon W. Knoebel, Madison; Donald E. Sydow, Oconomowoc, both of Wis.

[73] Assignee: Oconomowoc Mfg. Corp., Oconomowoc, Wis.

[22] Filed: Aug. 11, 1971

[21] Appl. No.: 170,925

[52] U.S. Cl. .............................................. 308/191
[51] Int. Cl. .......................................... F16c 33/00
[58] Field of Search.......................... 308/190, 193

[56] References Cited
UNITED STATES PATENTS
| 1,751,453 | 3/1930 | Beemer | 308/190 |
| 2,977,162 | 3/1961 | Brooks | 308/193 |
| 3,365,253 | 1/1968 | Holler | 308/190 |

FOREIGN PATENTS OR APPLICATIONS
| 132,208 | 9/1919 | Great Britain | 308/190 |
| 665,254 | 6/1963 | Canada | 308/190 |

Primary Examiner—Charles J. Myhre
Assistant Examiner—Frank Susko
Attorney, Agent, or Firm—Wheeler, Morsell, House & Wheeler

[57] ABSTRACT

Ball bearing assembly with an inner ball race having an outwardly facing groove and bearing balls orbitally disposed around said inner race in said groove, the outer race being formed by the co-action of a shell and a retainer, the shell having a peripheral tire band and a radially inwardly extending sidewall with radially and axially extending steps, the balls being held in part against an innermost step, the bearing ball retainer comprising a cupped annulus butted against another of said steps and held in position by mechanical anchors, such as welds between the retainer annulus and the shell.

9 Claims, 3 Drawing Figures

PATENTED APR 30 1974 3,807,818

INVENTORS
JEROME T. DONAHUE
WALTER F. HESS
GORDON W. KNOEBEL
DONALD E. SYDOW

By
Wheeler, House & Wheeler
ATTORNEYS

BEARING ASSEMBLY

BACKGROUND OF THE INVENTION

There is a commercial need for an inexpensive, but sturdy ball bearing assembly which can be incorporated in heavy duty rollers such as are utilized in suspensions for file cabinet drawers. Heretofore, the fabrication of such rollers with ball bearings have entailed relatively expensive machining operations and special assembly techniques which increase costs.

SUMMARY OF THE INVENTION

In accordance with the present invention, both the ball bearing retainer annulus and the outer shell which together form the outer race of the bearing are made of metal ideally suited for heavy service requirements. These two parts are united in a novel assembly which is not subject to separation under even heavy loads, such as those to which file cabinet rollers are subject.

The outer shell unitarily provides a peripheral tire band and a radially inwardly extended sidewall with radially and axially extending steps. One of these steps functions to guide and seat a ball bearing retainer annulus which is slid axially along the step into seated position, and is thereupon anchored in place. The axially extending step wall is desirably of a diameter slightly less than the external diameter of the retainer annulus, whereby they are mated with a press fit. Another of the steps is in contact with the ball, as is the retainer annulus.

The present invention is ideally suited for use of powdered metal as the material of which the outer shell is fabricated.

Other objects, features and advantages of the invention will appear from the disclosure hereof.

DESCRIPTION OF THE PREFERRED EMBODIMENT

Figure 1:
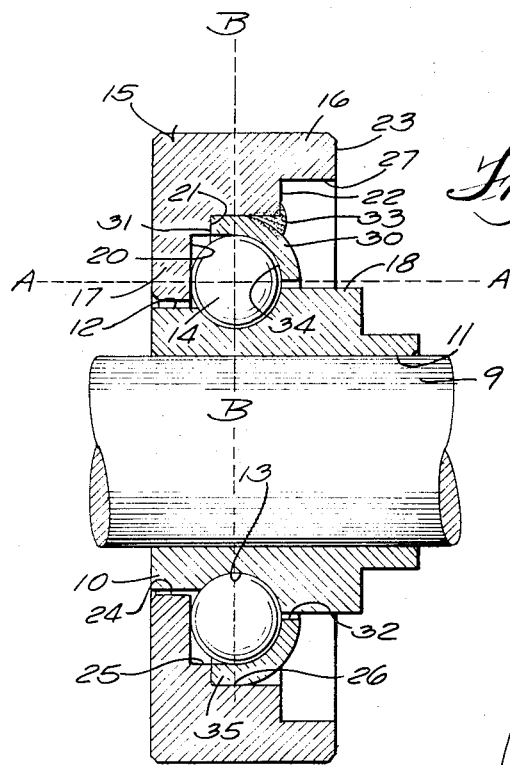
FIG. 1 is an axial cross section taken through a ball bearing roller assembly embodying the present invention.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The roller and bearing assembly comprises a one-piece inner race 10 which has a central bore 11 to receive an axle 9 or the like. The outside of race 10 is formed with a first cylindrical surface 12, a second cylindrical surface 18 of slightly larger diameter than cylindrical surface 12 and an intermediate outwardly facing shallow semi-circular groove 13 which receives a plurality of metal bearing balls 14 orbitally disposed in the groove 13 around the center of rotation of the race 10. The arcuate extent of groove 13 is desirably less than 180°, so that the major portions of the balls extend above the groove 13. In the disclosed embodiment the arcuate extent of groove 13 is approximately 150°.

The outer race is made up of two pieces, one of which comprises an outer shell 15 which has a unitary roller or tire band 16 and a radially inwardly projecting sidewall 17.

Sidewall 17 is provided with a series of radially extending stepped annular surfaces 20, 21, 22 and 23 and a corresponding series of axially extending stepped cylindrical surfaces 24, 25, 26, 27. The diameter of cylindrical surface 24 is just slightly larger than the diameter of the cylindrical surface 12 of the inner race 10, thus to provide clearance therebetween.

The innermost radially extending step surface 20 provides on sidewall of an outer race for the balls 14. The balls contact the step surface 20 on their great circles indicated for one of the balls as shown in the drawing as a horizontal plane A—A passing through the center of the ball 14, as the ball center extends considerably above the cylindrical surface 12 of inner race 10 and above cylindrical surface 24 of side wall 17, because groove 13 is shallow, as aforestated.

The other part of said outer race comprises a cupped ball retainer annulus 30 which has an outer edge 31 which faces and abuts radially stepped wall or shoulder 21. Inner edge wall 32 of annulus 30 is of an internal diameter slightly larger than the diameter of cylindrical surface 18 of the inner race 10 and is spaced slightly therefrom in the assembled position of the parts.

Retainer annulus 30 has a cylindrical margin 35 between its edge 31 and a vertical plane B—B passing through the center of the balls 14. From plane B—B to its inner edge 32 the annulus 30 is arcuate on a curve 34 corresponding to the radius of the balls 14.

Axially extended step or shoulder 26 of the outer shell 15 functions as a guide surface along which the retainer 30 is slid in the course of assembling the parts. The diameter of shoulder 26 is slightly less by about 0.0001 inch than the outer diameter of the cylindrical margin 35 of retainer 30. Accordingly, the retainer 30 and the shell 15 are assembled with a press fit. The cylindrical margin 35 of the retainer annulus fits securely into the corner at which shoulders 26 and 21 intersect, thus providing inherently stable support for the seated annulus 30 and holding the annulus with its curve 34 centered on the balls 14.

Figure 2:
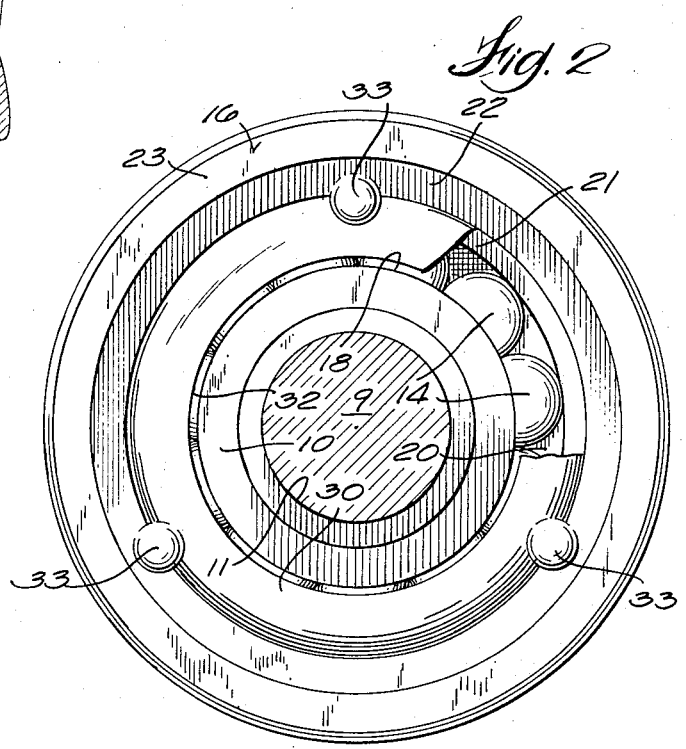
FIG. 2 is a side view of the assembly of FIG. 1, portions of the retainer being broken away to expose the bearing balls confined within the bearing race.
Figure 3:
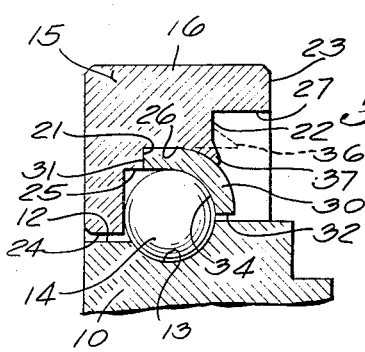
FIG. 3 is a fragmentary axial cross section taken through a modified embodiment of the invention.

After the edge 31 of retainer 30 butts the step 21 of housing shell 15, anchor means such as a plurality of circumferentially spaced anchors are applied between the periphery of the retainer 30 and the shell 15, thus to anchor the retainer 30 in place with its curved side wall 34 in bearing contact with the balls 14. In the embodiment of FIGS. 1 and 2 the anchors comprise tack welds 33 which span from radial step 22 to the external surface of retainer annulus 30. In the embodiment of FIG. 3, the corner of steps 22, 26 is formed initially as an axially extending flange 36 (broken lines). After the retainer annulus 30 is seated, the flange 36 is deformed inwardly at points spaced circumferentially about the annulus 30 by a punch or swaging tool to periodically upset the flange and form swaged anchors 37 which mechanically retain the annulus 30 in seated position. Accordingly, the mechanical anchors may comprise welds, swaging, brazing, etc.

Both the shell 15 and retainer annulus 30 are desirably made of steel. Annulus 30 is desirably case-hardened for durability and heavy service. The press fit of the retainer annulus 30 within the axially extending step or shoulder 26 and the anchors 33, 37 hold the various parts in fixed assembly which resists rupture even in the event of heavy loading of the roller.

Shell 15 can readily be molded from powdered metal, thus greatly simplifying fabrication techniques and eliminating the need for extensive machining and milling operatins. As a result an inexpensive, yet durable and reliable ball bearing roller assembly is produced.

We claim:

1. A bearing assembly comprising an inner ball race having an outwardly facing groove,
   bearing balls orbitally disposed around said inner race in said groove,
   a metal outer shell having a peripheral tire band and a radially inwardly extending sidewall with a plurality of radially extending flat steps,
   a bearing ball retainer comprising a cupped metal annulus,
   said bearing balls bearing laterally against one of said radial steps on the sidewall of the outer shell,
   said retainer annulus having an outer edge butted against another of the radial steps of the said sidewall,
   a plurality of metal welds circumferentially spaced about said retainer annulus and between the outer shell and retainer annulus for fastening the retainer annulus in place,
   said retainer annulus and said one radial step on the sidewall of the outer shell together forming an outer race for said bearing balls.

2. The invention of claim 1 in which said retainer annulus has an inner edge facing the inner ball race.

3. The invention of claim 2 in which said shell has an axially extending shoulder intersecting said radial step, said retainer annulus having a cylindrical margin terminating in said outer edge, said margin being seated into said intersection.

4. The invention of claim 3 in which the cylindrical margin of said retainer annulus terminates on a plane through the center of said bearing balls, said retainer annulus having an arcuate portion from said plane to its said inner edge.

5. The invention of claim 1 in which said sidewall comprises an axially extending shoulder intersecting the radial step to which the retainer annulus is butted, said axially extending shoulder having a diameter slightly less than the external diameter of the retainer annulus to require a press fit therebetween.

6. The invention of claim 1 in which the retainer annulus comprises case hardened metal.

7. The invention of claim 1 in which the outer shell comprises powdered metal.

8. The invention of claim 1 in which said sidewall comprises an axially extending shoulder intersecting the radial step to which the retainer annulus is butted, said axially extending shoulder forming a guide for said retainer and supporting it in bearing relation to the balls.

9. The invention of claim 9 in which the retainer annulus has a cylindrical margin in press fit with said shoulder.

* * * * *